R. D. WEBB.
METHOD OF RE-FORMING AND COMPRESSING BALES OF COTTON OR OTHER MATERIALS.
APPLICATION FILED OCT. 28, 1915.

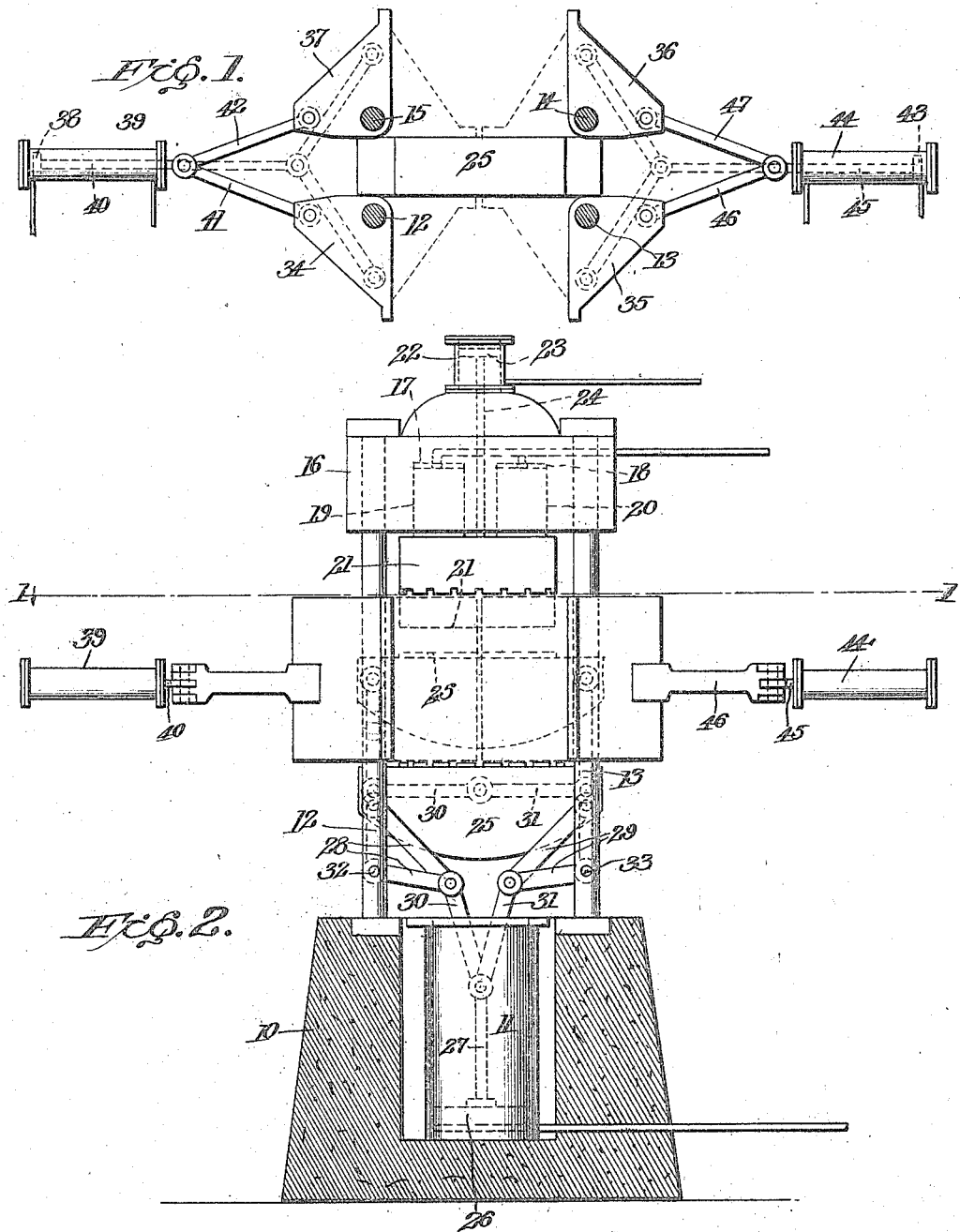

1,257,558.

Patented Feb. 26, 1918.
2 SHEETS—SHEET 2.

Witnesses
G. T. Baker
H. P. Jennings

Inventor
Robert D. Webb
by Foster, Freeman, Watson & Coit
Attorneys

UNITED STATES PATENT OFFICE.

ROBERT D. WEBB, OF MINDEN, LOUISIANA.

METHOD OF RE-FORMING AND COMPRESSING BALES OF COTTON OR OTHER MATERIALS.

1,257,558.      Specification of Letters Patent.      Patented Feb. 26, 1918.

Application filed October 28, 1915. Serial No. 58,390.

*To all whom it may concern:*

Be it known that I, ROBERT D. WEBB, a citizen of the United States, residing at Minden, Webster parish, State of Louisiana, have invented certain new and useful Improvements in Methods of Re-Forming and Compressing Bales of Cotton or other Materials, of which the following is a specification.

This invention relates to methods of compressing bales of cotton or other material and has for its object to provide a method of compressing which will produce a better and more attractive bale in which the cotton is compressed substantially uniformly throughout the bale and in which excessive compacting of the cotton is avoided.

It is the practice in cotton districts to have at centrally located points compressing plants which take the bales, as they are formed on the plantations or at the gins, and compress them into much smaller sizes in order to have them take up less space on board cars and ships and at the warehouses, docks, etc. Methods of compressing which have been heretofore employed have been objectionable on account of the extreme pressure used on final compression of the bale being applied while its sides are confined between the side pressure plates, thereby pressing the bagging or covering into the edges or layers of cotton so that it is difficult to remove the same, and also leaving the central portions of the sides of the bale exposed, and also causing the edges of the layers of cotton that come into contact with the side plates to rub against the same so hard and to be compressed so tightly that these edges are rendered very smooth; in many instances so smooth and hard that it is almost possible to write upon them with a pencil. These are objectionable features and produce waste. It has also been the practice to press the bales in from the ends at the same time that they are receiving the side pressure and this results in making what is called "cross packing" and causes a larger proportion of the cotton of the bale to be accumulated at or near the ends of the bale, so that the ends have a much higher density than the other portions of the bale. One of the reasons why there is a serious objection to having the cotton most dense at the ends of the bale is that the ends are the parts which are most frequently damaged, or are in damaging condition when compressed.

In the accompanying drawings I have illustrated in a general way means whereby my improved method may be carried out. In these drawings, Figure 1 is a section on the line 1—1 of Fig. 2;

Fig. 2 is a side elevation;

The method of compressing the bales which I employ consists in first pressing the bale in one direction, then compressing it in a direction substantially at right angles to the first pressing, sufficiently to cause the reassembled bale to retain its reformed shape after the side confining plates are removed, while the pressure of the first pressing is maintained, then removing the pressure of the first pressing (the confining plates) and making a further and final compression in the direction of the last compression.

Figure 10:
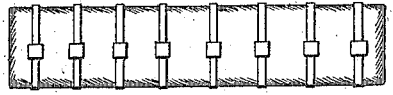

In the apparatus shown in Figs. 1 and 2, 10 indicates any suitable foundation which supports the pressure cylinder 11 and the rods 12, 13, 14, and 15. These rods carry at their upper ends a housing 16 containing the cylinders 17 and 18 in which are arranged the plungers 19 and 20, respectively. A platen 21 is rigidly connected with and actuated by the plungers 19 and 20. A cylinder 22 is also arranged on the housing 16 and contains a piston 23, which is connected with the platen 21 by the rod 24, for the purpose of returning the platen after the completion of a compression movement. A lower platen 25 is suitably guided and actuated by a piston 26 in the cylinder 11, the piston having a rod 27 which is connected with pairs of toggle links 28 and 29 by links 30 and 31, respectively. The lower link of each of the pairs 28 and 29 has a fixed pivot, as indicated at 32 and 33, and the upper link of each pair is pivotally connected with the platen 25. Side doors or displacing plates 34, 35, 36 and 37 are pivoted on the rods 12, 13, 14 and 15, respectively, and are swung from the full line positions shown in Fig. 1 to the dotted line positions to compress the bale laterally. The doors 34 and 37 are actuated by a piston 38 in the cylinder 39, the piston being connected with the doors by means of a rod 40 and links 41 and 42. The doors 35 and 36 are similarly actuated by a piston 43 in cylinder 44, the piston being connected with the doors by the rod 45 and links 46 and 47.

In the operation of the apparatus the parts are first arranged as shown in full lines in Figs. 1 and 2 and the bale is placed on the platen 25. The side doors 34, 35, 36 and 37 are then swung in against the sides of the bale by pressure applied to the pistons 38 and 43.

Figure 3:
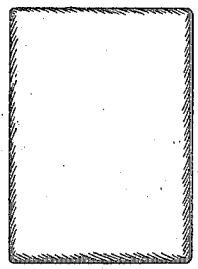
Figs. 3 and 4 are, respectively, end and side elevations of a bale before being compressed.
Figure 4:
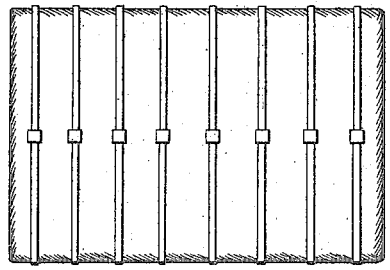
Figure 5:
Figs. 5 and 6 are, respectively, end and side elevations of the bale after the first operation.
Figure 6:
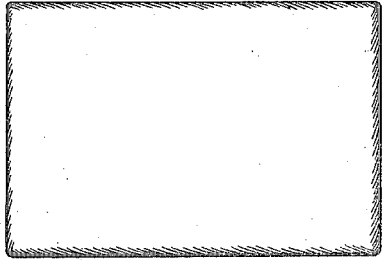
Figure 7:
Figs. 7 and 8 are, respectively, end and side elevations of the bale after the second operation.
Figure 8:
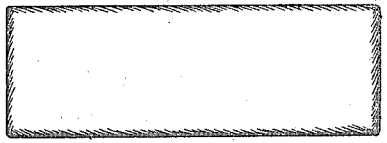
Figure 9:
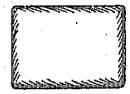
Figs. 9 and 10 are, respectively, end and side elevations of the bale after the final operation.

After the doors 34, 35, 36 and 37 have reached the dotted line position shown in Fig. 1, the bale is substantially of the shape indicated in Figs. 5 and 6. The doors are maintained in this position and the platen 25 is moved upward by subjecting the lower side of the piston 26 to the pressure fluid. The platen 25 continues its upward movement until the toggles 28 and 29 straighten out and the links 30 and 31 assume the horizontal positions indicated in dotted lines. In this way the bale is lightly compressed in a direction at right angles to the first pressing to substantially the shape indicated in Figs. 7 and 8. When the platen 25 reaches the limit of its upward movement or the bale has been compressed sufficiently for it to retain its re-assembled form, the doors 34, 35, 36 and 37 are swung outward away from the bale and the latter is relieved of the lateral pressure. The platen 21 is then forced down to the dotted line position, thereby giving the bale its final heavy compression and producing substantially the shape indicated in Figs. 9 and 10, without having the cotton rub along the doors 34, 35, 36 and 37. After the compression by the platen 25, the density of the bale is such that it will retain its re-assembled form without confining plates and such that further compression, while maintaining the lateral pressure by means of the doors, would tend to crowd the bagging or covering against the upper corners of the bale and mash it into the edges of the layers of cotton on the sides of the bale, and would also smooth and harden the cotton at the edges of the layers of the cotton on the sides of the bale and leaves its sides uncovered and hence by removing the doors 34, 35, 36 and 37 before the final heavy compression by the platen 21 these difficulties, which have attended the processes of compression heretofore employed, are eliminated.

After the completion of the compression movement of the platen 21, the bale is tied or banded as shown in Fig. 10, or in the usual way, and the platen 21 is lifted by the piston 23 and the platen 25 lowered to its original position, and the bale removed from the platen 25 and another bale is placed in position.

Figure 11:
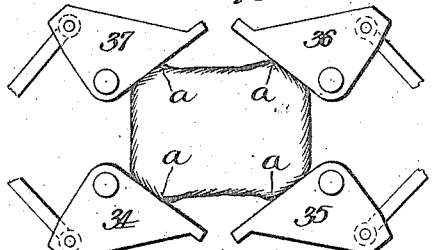
Fig. 11 is a diagrammatic view showing one mode of operation of the side pressure doors.

Referring to Fig. 11, it will be seen that the doors first act upon the sides of the bale at the end corners of the same, and the pressure is applied to the sides of the bale progressively from the end corners toward the middle of the lateral sides. In applying the pressure this way the cotton is pushed toward the middle of the bale, as in the manner indicated at the points $a$, and in this way the cotton in the bale is reassembled and a greater uniformity of density is secured.

From the foregoing it will be evident that this improved method of compressing may be carried out with rapidity and uniformity, and that while the apparatus which I have shown is adapted to carry out the improved method, other forms of apparatus may be employed.

Having thus described my invention, what I claim and desire to secure by Letters Patent is:

1. The method substantially as hereinbefore set forth of compressing bales which have been previously formed under pressure, which consists in first pressing the bale in one direction, then compressing the bale in a direction substantially at right angles to the first pressure while the pressure in the first direction of pressing is maintained, then removing the pressure of the first pressing, and then further compressing the bale in the direction of the last compression.

2. The method substantially as hereinbefore set forth of compressing bales which have been previously formed under pressure, which consists in first pressing the bale in on its sides, then compressing the bale in a direction substantialy at right angles to the first pressing while the pressure in the direction of the first pressure is maintained, then removing the pressure of the first pressing and then further compressing the bale in the direction of the last compression.

3. The method substantially as set forth of compressing bales which have been previously formed under pressure, which consists in first pressing the bale in on its sides, then compressing the bale sufficiently in a direction substantially at right angles to the first pressing, while the pressure in the direction of the first pressing is maintained, to make it retain its reformed shape after the pressure of the first pressing is removed, then removing the pressure of the first pressing, and then further compressing the bale in the direction of the last compression.

4. The method substantially as hereinbefore set forth of compressing bales which have been previously formed under pressure, which consists of first pressing the bale in one direction progressively on its sides from the ends to the middle, then compressing the bale in a direction substantially at right angles to the first pressing while the pressure of the first pressure is maintained, then removing the pressure of the first pressing and then further compressing the bale in the direction of the last compression.

5. The method substantially as set forth of reforming bales, that have been previously formed under pressure, prior to final compression, which consists of first pressing the bale on its sides, making it narrower, then compressing the bale while confined between these side pressers sufficiently to make it hold its reformed shape after these side pressers have been removed, and then removing the side pressure plates prior to the final compression act.

In testimony whereof I affix my signature.

ROBT. D. WEBB.

Copies of this patent may be obtained for five cents each, by addressing the "Commissioner of Patents, Washington, D. C."